United States Patent
Yoshida et al.

(10) Patent No.: US 8,069,237 B2
(45) Date of Patent: Nov. 29, 2011

(54) NETWORK SYSTEM, INFORMATION MANAGEMENT SERVER, AND INFORMATION MANAGEMENT METHOD

(75) Inventors: Takeo Yoshida, Minato-ku (JP); Naoki Yamada, Minato-ku (JP); Fumio Kitagawa, Minato-ku (JP)

(73) Assignee: Fuji Xerox Co., Ltd., Tokyo (JP)

(*) Notice: Subject to any disclaimer, the term of this patent is extended or adjusted under 35 U.S.C. 154(b) by 0 days.

(21) Appl. No.: 12/585,951

(22) Filed: Sep. 29, 2009

(65) Prior Publication Data

US 2010/0023612 A1    Jan. 28, 2010

Related U.S. Application Data

(62) Division of application No. 10/322,494, filed on Dec. 19, 2002, now Pat. No. 7,617,309.

(30) Foreign Application Priority Data

Dec. 27, 2001 (JP) .................... 2001-398337
Oct. 4, 2002 (JP) .................... 2002-292963

(51) Int. Cl.
    *G06F 15/173* (2006.01)
(52) U.S. Cl. .................... 709/223; 709/203; 709/224
(58) Field of Classification Search .................. 709/203, 709/223, 224, 226, 232, 201, 227, 221, 202
    See application file for complete search history.

(56) References Cited

U.S. PATENT DOCUMENTS

| | | | |
|---|---|---|---|
| 6,078,943 | A | 6/2000 | Yu |
| 6,094,672 | A | 7/2000 | Willie et al. |
| 6,101,508 | A | 8/2000 | Wolff |
| 6,185,601 | B1 | 2/2001 | Wolff |
| 6,275,846 | B1 | 8/2001 | Kondo et al. |

(Continued)

FOREIGN PATENT DOCUMENTS

JP    A-7-302242    11/1995

(Continued)

*Primary Examiner* — Barbara Burgess
(74) *Attorney, Agent, or Firm* — Oliff & Berridge, PLC

(57) ABSTRACT

To reduce the load on a management server in a load distributed system, a server list manager 16 of a management server 10 selects servers 4, 6, 20, and 30 to be accessed by a client terminal management server 43 by referencing an operation status or a load status of the servers 4, 6, 20, and 30, generates a server list, and sends the generated server list to the client terminal management server 43. An inquiry unit 47 of the client terminal management server 43 regularly sends an inquiry to the network monitoring server 30, which is included in the server list 45, to ascertain whether or not information has been updated. If the information has been updated, an information collection unit 48 acquires a corresponding latest module and a rule base from the information providing server 20 included in the server list 45 based on information from the network monitoring server 30.

3 Claims, 5 Drawing Sheets

U.S. PATENT DOCUMENTS

| | | | |
|---|---|---|---|
| 6,405,262 B1 * | 6/2002 | Vogel et al. | 719/315 |
| 6,418,466 B1 | 7/2002 | Bertram et al. | |
| 6,601,084 B1 * | 7/2003 | Bhaskaran et al. | 709/223 |
| 6,816,860 B2 * | 11/2004 | Yamamoto | 707/703 |
| 7,062,567 B2 | 6/2006 | Benitez et al. | |
| 7,500,243 B2 | 3/2009 | Huetsch et al. | |
| 2001/0037358 A1 | 11/2001 | Clubb et al. | |
| 2001/0049717 A1 | 12/2001 | Freeman et al. | |
| 2003/0005096 A1 | 1/2003 | Paul et al. | |
| 2003/0105802 A1 * | 6/2003 | Kurashima et al. | 709/203 |
| 2003/0187969 A1 | 10/2003 | Wilcock | |
| 2003/0191877 A1 | 10/2003 | Zaudtke et al. | |
| 2004/0030718 A1 | 2/2004 | Boros et al. | |

FOREIGN PATENT DOCUMENTS

| | | | |
|---|---|---|---|
| JP | 08044677 | * | 2/1996 |
| JP | A-8-44677 | | 2/1996 |
| JP | A-9-73424 | | 3/1997 |
| JP | A-10-105498 | | 4/1998 |
| JP | A-11-232194 | | 8/1999 |

* cited by examiner

|  | MANAGEMENT SERVER ADDRESS | NETWORK MONITORING SERVER ADDRESS | INFORMATION PROVIDING SERVER ADDRESS | DNS SERVER ADDRESS | NTS SERVER ADDRESS | OTHERS |
|---|---|---|---|---|---|---|
| PRIMARY | MS1 | NOC1 | DC1 | DNS3 | NTS1 | |
| SECONDARY | MS2 | NOC3 | DC3 | DNS1 | NTS2 | |

Fig. 3

NETWORK SYSTEM, INFORMATION MANAGEMENT SERVER, AND INFORMATION MANAGEMENT METHOD

BACKGROUND OF THE INVENTION

This is a Division of application Ser. No. 10/322,494 filed Dec. 19, 2002, now U.S. Pat. No. 7,617,309.

1. Field of the Invention

The present invention generally relates to an improved information management method for use in an information management server that manages information in a network system that provides client terminals with information, and to the configuration of a system that reduces the load on a management server in a load distributed system.

2. Description of Related Art

Systems which manage information provided in response to requests from client terminals in a network system can be classified into centralized and distributed configurations. A centralized information management system includes an information management server that integrally manages management information in the network system, and the information management server provides information in response to the client terminals. In such a system configuration, the system load involved in providing information is concentrated on the management server.

On the other hand, in a distributed information management system, the information management server delivers information, which will be provided to the client terminals, to a plurality of information providing servers for storage on those servers. The client terminals, which are divided into groups, access only a corresponding information management server. This "distributed" configuration reduces the load on the information management server. However, this distributed information management system requires close communication between the information providing servers and the information management server to confirm that the information providing servers are providing services normally based on the delivered information. This communication increases network traffic and the overall load on the servers.

In addition, when the status of the client terminals is monitored in the server side in such a distributed information management system, the information management server is usually responsible for monitoring the status of the client terminals.

As described above, whether a client-server network system is centralized or distributed, the functions tend to centralize on the servers. As more client terminals are connected, the load on the server becomes heavier. A need therefore exists for an information management method that reduces the load on the server.

This condition also applies to a distributed information management system. That is, as more clients are connected, more information providing servers are required and, as a result, the load increases on the information management server that communicates with the information providing servers. Thus, the distributed information management system does not provide a final solution for reduction of load on the server.

The present invention seeks to solve the problems associated with the related art as described above. It is an object of the present invention is to provide an information management server that implements an improved information management method.

It is another object of the present invention to provide a client terminal management server that can reduce the load on a management server managing the system in a load distributed system.

It is still another object of the present invention to provide a management server for use in a load distributed system that can provide the client system with information useful to reduce the load.

SUMMARY OF THE INVENTION

To achieve the above objects, a network in one embodiment of the present invention comprises at least one delivery destination apparatus, at least one delivery source apparatus storing information to be referenced by the delivery destination apparatus, and a management apparatus, wherein the delivery destination apparatus comprises means for outputting status information on a status of a delivery source apparatus; means for receiving a setup of a delivery source apparatus list generated by the management apparatus based on the status information that is output, said list being composed of delivery source apparatuses storing information to be referenced; and means for determining a delivery source apparatus, which stores information to be referenced, using the list that is set up.

A delivery destination apparatus according to one aspect of the present invention forms a network system in conjunction with at least one delivery source apparatus storing information and a management apparatus. The delivery destination apparatus comprises means for detecting and outputting status information on a status of the delivery source apparatus; means for receiving a setup of a delivery source apparatus list generated by the management apparatus based on the status information that is output, said list being composed of delivery source apparatuses storing information to be referenced; and means for determining a delivery source apparatus, which stores information to be referenced, using the list that is set up.

The information to be referenced by the delivery destination apparatus may be information updated by degrees, and the means for determination determines a delivery source apparatus, which will be referenced, from the delivery source apparatuses included in the list based on the detected status of the delivery source apparatus and on an update status of information stored in the delivery source apparatus.

The means for detecting status information accesses the delivery source apparatus at a predetermined interval of time to detect an operation status of the delivery source apparatus and, checks throughput of communication with the delivery source apparatus to detect a load status of the delivery source apparatus, and the predetermined time varies according to the load status.

A control method according to another aspect of the present invention is for use on a delivery destination apparatus that forms a network system in conjunction with at least one delivery source apparatus storing information and a management apparatus. The method comprises the steps of detecting and outputting a status information on a status of the delivery source apparatus; receiving a setup of a delivery source apparatus list generated by the management apparatus based on the status information that is output and composed of delivery source apparatuses storing information to be referenced; and determining a delivery source apparatus, which stores information to be referenced, using the list that is set up.

In still another aspect of the present invention, a program executed by a delivery destination apparatus that forms a network system in conjunction with at least one delivery source apparatus storing information and a management apparatus causes the delivery destination apparatus to execute a procedure for detecting and outputting a status information on a status of the delivery source apparatus; a procedure for receiving a setup of a delivery source apparatus list generated by the management apparatus based on the status information that is output and composed of delivery source apparatuses storing information to be referenced; and a procedure for determining a delivery source apparatus, which stores information to be referenced, using the list that is set up.

An information management server according to one aspect of the present invention comprises information collection processing means for generating client information, contents information for acquiring or updating management object information, and management information on the contents information by interpreting contents of received information or for acquiring the information from an information storage location identified by the contents of the received information; connection monitoring means for monitoring an operation status of a client terminal by checking if the client terminal regularly accesses management information; and information transmission means for transmitting the contents information in response to an information acquisition request from the client terminal.

An information management method according to one aspect of the present invention is a method wherein management information used for managing information and contents information used for acquiring or updating information that is managed is generated by interpreting contents of received information or is acquired from an information storage location identified by the contents of the received information, wherein an operation status of a client terminal is monitored by checking if the client terminal regularly accesses management information, and wherein the contents information is transmitted in response to an information acquisition request from the client terminal.

A management server for use in a load distributed system according to the present invention may form a network system in conjunction with one or more client systems, a plurality of information providing servers storing information to be referenced by the client systems, and a network monitoring server with a network monitoring function and that executes system management of the network system. The management server comprises an intra-system information management database in which information providing server management information, which is used for keeping track of information distributed among the information providing servers, is recorded, and server list management means for selecting the servers to be accessed by each of the client systems to generate a list of the selected servers based on the intra-system information management database and on a load status of each of the servers included in the network system, wherein, when collecting information, each of the client systems references the server list to directly access the servers.

When system failure information which indicates that one of multiplexed network monitoring servers has failed is received from another network monitoring server that detects the failure, the server list management means re-generates the server list and sends the re-generated server list to the client system that accesses the network monitoring server that is referenced in the information.

An information management method according to the present invention can be used in a load distributed system comprising a management server that forms a network system in conjunction with one or more client systems, a plurality of information providing servers each storing information to be referenced by the client systems, and a network monitoring server with a network monitoring function and that executes system management of the network system, wherein, based on an intra-system information management database in which information providing server management information is stored to keep track of information distributed among the information providing servers and on a load status of each of the servers included in the network system, the servers to be accessed by each of the client systems are selected to generate a list of the selected servers and wherein, when collecting information, each of the client systems references the server list to directly access the servers.

A client terminal management server for use in a load distributed system according to the present invention may form a network system in conjunction with information providing servers each storing information to be provided in the network system, a network monitoring server with a network monitoring function, and a management server that executes system management of the network system and that acquires information to be referenced by a connected client terminal or by the client terminal management server from one of the information providing servers. The client terminal management server comprises server list storing means for storing a pre-generated list of the servers to be accessed; and information collection processing means for accessing the corresponding servers based on the server list to collect necessary information, wherein, when collecting information, the client terminal management server directly accesses the servers by referencing the server list.

The server list storing means may store a plurality of sets of server lists and, when it is detected that one of the servers in the server list being referenced is failing, the information collection processing means may switch the server list to be referenced to another server list to continue to access the servers.

The server list may be generated based on information providing server management information used to keep track of information distributed among the information providing servers and on a load status of the servers included in the network system and may be downloaded by the management server.

The information collection processing means may notify the network monitoring server that the client terminal management server is active by regularly querying the network monitoring server, which also acts as the information providing server, as to whether or not there is update information.

According to another aspect of the present invention, an information management method for use on a client terminal management server forms a network system in conjunction with information providing servers each storing information to be provided in the network system, a network monitoring server with a network monitoring function, and a management server that executes system management of the network system and acquires information to be referenced by a connected client terminal or by the client terminal management server from one of the information providing servers, wherein in order to collect necessary information, the client terminal management server directly accesses the servers by referencing a pre-generated list of the servers to be accessed.

According to a still further aspect of the present invention, a medium records therein a program for use in a load distributed system according to the present invention and for execution on a management server that forms a network system in conjunction with one or more client systems, a plurality of information providing servers each storing information to be referenced by the client systems, and a network monitoring server with a network monitoring function and that executes system management of the network system, wherein, based on information providing server management information tracking information distributed among the information providing servers and on a load status of each of the servers included in the network system, the program selects the servers to be accessed by each of the client systems to generate a list of the selected servers.

On another medium according to the present invention is recorded a program for use in a load distributed system according to the present invention and for execution on a client terminal management server that forms a network system in conjunction with information providing servers each storing information to be provided in the network system, a network monitoring server with a network monitoring function, and a management server that executes system management of the network system and that acquires information to be referenced by a connected client terminal or by the client terminal management server from one of the information providing servers, wherein, when collecting information, the client terminal management server directly accesses the servers by referencing a server list in which an address list of the servers to be accessed is included.

BRIEF DESCRIPTION OF THE DRAWINGS

FIG. 3 is a diagram showing an example of a server list generated by a management server in the embodiment.

An embodiment of the embodiment will be described below with reference to the drawings.

DESCRIPTION OF THE PREFERRED EMBODIMENT

Figure 1:
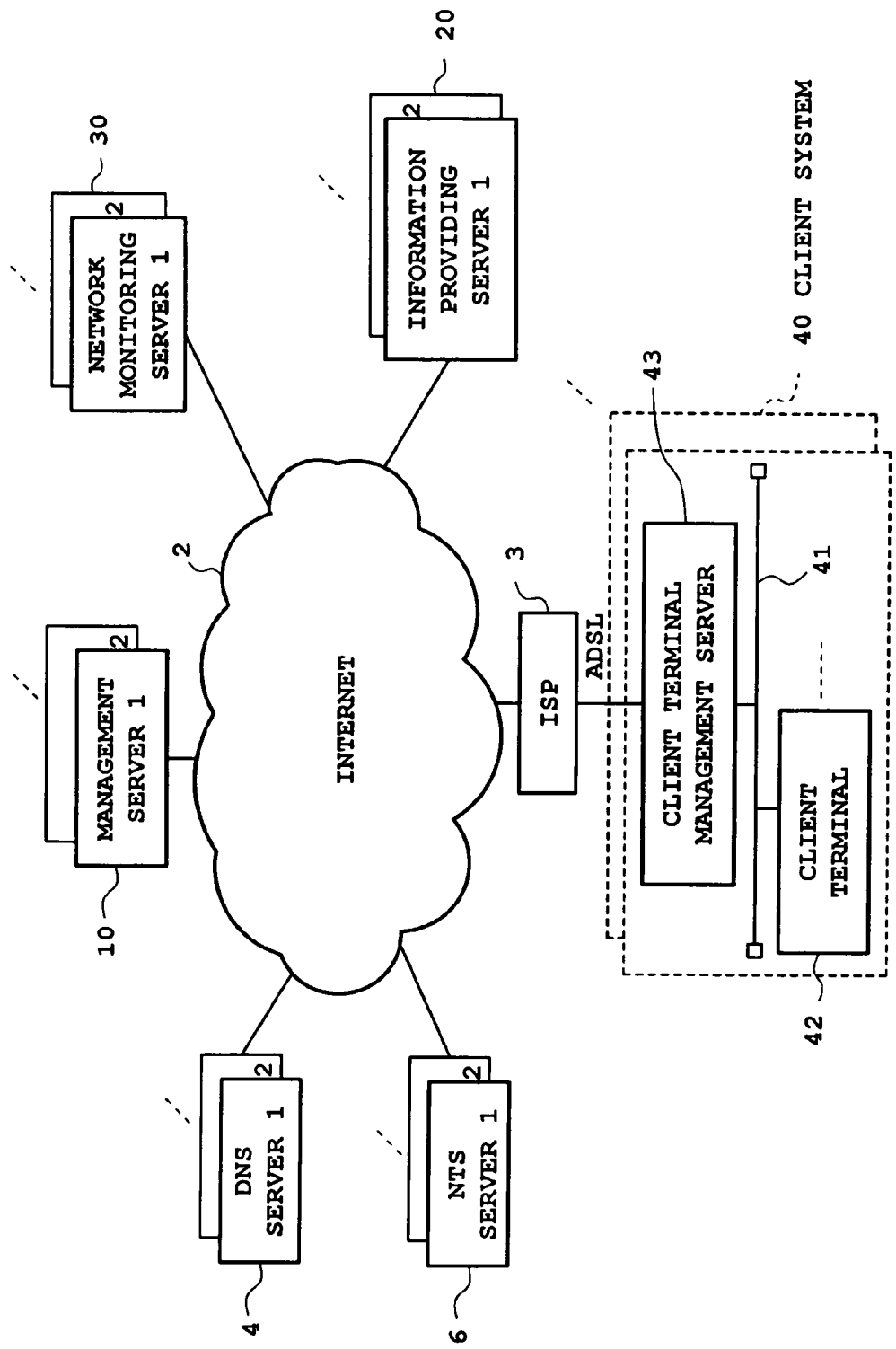
FIG. 1 is a diagram showing the general configuration of a load distributed system according to an embodiment of the present invention.
Figure 2:
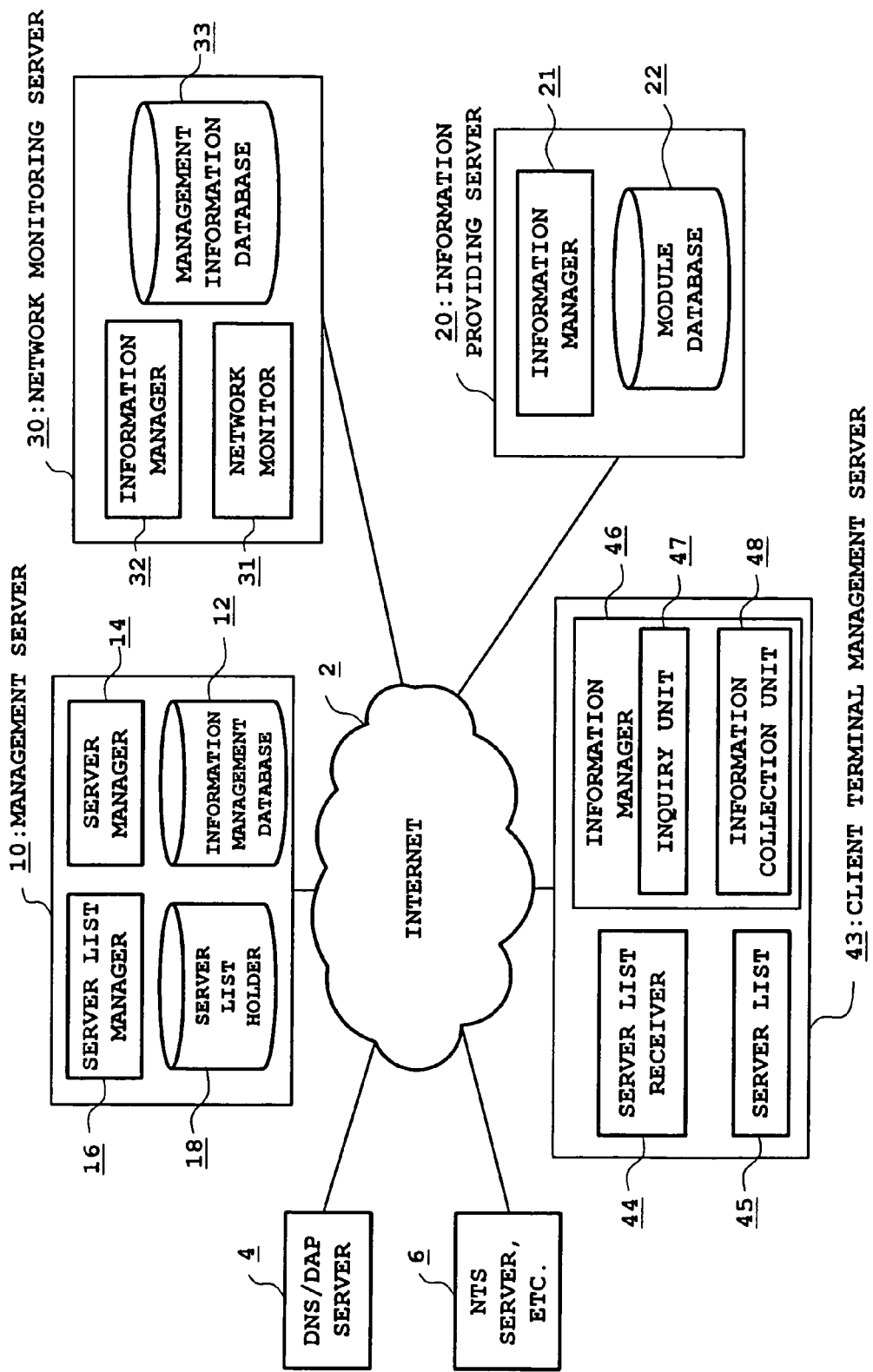
FIG. 2 is a block diagram showing the configuration of the load distributed system in the embodiment.

FIG. 1 is a diagram showing the general configuration of an embodiment of a load distributed system according to the present invention, and FIG. 2 is a block diagram of the system configuration. The load distributed system in the embodiment is built as a network system composed of the computers connected via the Internet 2. These computers will be described further below. FIG. 1 shows a management server 10 provided for managing the whole network system, an information providing server 20 that stores information to be provided to the clients, a network monitoring server 30 that monitors the network and, also, acts as an information providing server that stores information to be provided to the clients, a DNS (Domain Name Server)/DAP (Data Access Protocol) server 4 that manages domain names, an NTS(Network Time Service) server 6 that manages network time, and a client system 40 that receives necessary information from the servers described above. The client system 40 comprises one or more client terminals 42 connected to a LAN 41 and a client terminal management server 43. The client terminal management server 43, which corresponds to a DHCP (Dynamic Host Configuration Protocol) server for the client terminal 42, manages the addresses of the client terminals 42. The client terminal management server 43 also obtains information, required by the client terminal 42 or the server itself for reference, from the servers 4, 6, 20, and 30 according to a predetermined processing procedure.

The management server 10 is a backbone server computer that integrally manages the network in a conventional system. One of the objects of the present invention is to reduce the load on the management server 10. The management server 10 comprises an information management database 12, a server manager 14, a server list manager 16, and a server list holder 18 as shown in FIG. 2.

The information management database 12 stores therein client information on the client system 40 such as information on the correspondence between the client terminal management server 43 and client terminals 42, contents information used to obtain or update information on management objects, and management information related to the contents information. The information described above is received from the input means not shown, is generated by interpreting the contents of information received from the contents server, or is collected from an information storage location identified by the contents of received information.

Also recorded in the information management database 12 is information providing server management information used to identify information that is distributed between the servers 20 and 30. The server manager 14 manages and monitors the servers 4, 6, 20, and 30; for example, it distributes information among the servers, connects or disconnects the servers to or from the load distributed system, or starts or stops the servers. The server list manager 16 selects the servers 4, 6, 20, and 30 to be accessed by the client terminal management server 43 based on the information management database 12 and on the load status of the servers 4, 6, 20, and 30 included in the network system and generates a list of addresses of the selected servers 4, 6, 20, and 30 (hereinafter referred to as the "server list"). Then, the server list manager 16 writes the server list into a server list holder 18 and, at the same time, sends the server list to the network monitoring server 30. Although the system may be implemented by one management server 10, the management server 10 is multiplexed in this embodiment to provide one or more mirror servers. This configuration allows the system to work continuously even if one of the management servers 10 goes down due to an unexpected failure or temporarily stops due to maintenance work.

The network monitoring server 30, functionally equivalent to the NOC (Network Operation Center), comprises a network monitor 31, an information manager 32, and a management information database 33. The network monitor 31 uses the network monitoring function to monitor the operation status of the client terminal management server 43. The management information database 33 stores management information on contents information distributed from the management server 10. More specifically, the stored management information includes management information such as information indicating that contents information has been updated or indicating where contents information is stored and information used to provide the user with necessary business rules. The information manager 32 is a means which executes the function of an information providing server and provides information stored in the management information database 33 in response to a request from the client terminal management server 43.

The information providing server 20 comprises an information manager 21 and a module database 22. The module database 22 is a database in which information distributed from the management server 10 is stored. More specifically, contents information is stored including the latest module of the knowledge database and the latest module of the rule base used by the client terminal management server 43. Information provided in this embodiment is an object that is a copy of an instance stored in the management server 10. This information is allocated by the management server 10. In addition, the module database 22 associates the objects stored in and managed by the client terminal management server 43 with the objects stored in and managed by the information providing server 20. The network monitoring server 30 manages those objects.

The information providing server 20 and the network monitoring server 30 together comprise the "delivery destination apparatus" of the management server 10 because they receive objects from the management server 10. The management server 10 is the "delivery source apparatus" of the information providing server 20 and the network monitoring server 30.

The client terminal management server 43 comprises a server list receiver 44, a server list 45, and an information manager 46. The server list receiver 44 receives the server list 45 sent from the network monitoring server 30. The information manager 46 comprises an inquiry unit 47 and an information collection unit 48. The inquiry unit 47 manages information in the client system side and queries the network monitoring server 30 specified in the server list 45 as to whether necessary information has been updated in the client system. The information collection unit 48 collects the latest information from the network monitoring server 30 or information providing server 20 specified in the server list 45 when the information is updated.

Those servers basically provide the services described below. That is, the management server 10 receives information on an object (object information) and stores the received information. This object information is distributed to the information providing server 20 and the network monitoring server 30 at a predetermined time. In this embodiment, it is not necessary for the management server 10 to confirm whether or not the information providing server 20 or the network monitoring server 30 is performing processing correctly based on the distributed object information. This will be described in more detail below.

The information providing server 20 executes predetermined processing based on the received object information. For example, if the object information indicates that updater for one or more software modules or patch data (software update data) is available and if the information may be obtained, the information providing server 20 obtains the updater from the URL included in the object information and stores the obtained information. The information providing server 20 collects various object information, such as various contents, and information obtained based on the object information. However, if the information cannot be collected for some reason, the information providing server 20 may suspend the collection under some conditions (for example, the information cannot be collected within a predetermined time).

The network monitoring server 30 executes predetermined processing based on the received object information. For example, if the received object information indicates that updater for one or more software modules or patch data is available, the network monitoring server 30 stores the outline information on the data, such as information identifying the software module, the version of the module to which the updater or patch data is to be applied, and the version of the updated module.

The information stored in the information providing server 20 or the network monitoring server 30 is delivered to a requesting client in response to a received request. Therefore, in this sense, the information providing server 20 and the network monitoring server 30 are a delivery source apparatus, while the client is a delivery destination apparatus. The client regularly accesses the network monitoring server 30 to inform it of the operation status and to acquire the outline information obtained from the object information and, if the software module is updated, requests the information providing server 20 to send update data. The information providing server 20 returns the outline information (version information) on the update data of the requested software module if it is stored. The client judges whether the update data on the version indicated by the outline information is necessary and, if necessary, acquires that data. At this point, if the update data version is at least a predetermined number of generations older than the latest (for example, three or more generations older), the client directly or indirectly informs the management server 10 that information on the information providing server 20 is not updated.

That is, the management server 10 does not communicate with the information providing server 20 but receives information on the information providing server 20 from the client indicating that the information providing server 20 is abnormal. For this reason, it is not necessary for the management server 10 to confirm whether or not normal processing is being executed based on distributed objects. This applies equally to the network monitoring server 30. That is, if the speed (throughput) of communication between the client terminal management server 43 and the network monitoring server 30 becomes lower than a predetermined speed, information indicating that the network monitoring server 30 is abnormal is sent directly or indirectly to the management server 10.

In this embodiment, not only the management server 10 but also the servers 4, 6, 20, and 30 are multiplexed. This multiplexing is required to distribute the load on the servers 4, 6, 20, and 30 that will be accessed by many client systems 40. Therefore, shortly after assembly of a system in which a small number of client systems are connected, the servers need not be multiplexed, that is, one for each server may be enough. However, as more and more client systems access the servers 4, 6, 20, or 30, the probability of any server reaching its processing power limit will increase. FIG. 1 shows multiplexed servers 4, 6, 20, and 30 to solve this problem. Considering the number of connected client systems 40 and the processing power of the server computers, mirror servers are added to the servers 4, 6, 20, and 30 as necessary. In addition, with emphasis on the difference between the processing loads and on the difference between the degrees of usage, this embodiment allows one server to deliver information indicating "the information has been updated" and another server to deliver actual data including update data. This method makes it possible to independently adjust the number of information providing servers 20 and the number of network monitoring servers 30 when mirror servers are added. That is, those two numbers may be different.

This embodiment is characterized in that the management server 10 generates the server list 45 to allow the client terminal management server 43 to actively and directly access the servers included in the server list 45. This reduces the load on the management server 10 because the server is not accessed by the client system 40 during normal operation.

The ability of the client terminal management server 43 in this embodiment to directly access the servers 4, 6, 20, and 30 as described above requires the server list 45 in which the addresses of the servers 4, 6, 20, and 30 are included. Therefore, generation of the server list 45 will first be described.

When a new client terminal management server 43 is added to the load distributed system, the server list manager 16 of the management server 10 generates a server list, such as the one shown in FIG. 3, for the client terminal management server 43. Referring to FIG. 3, the following describes the data configuration of the server list.

The server list, a table created for each client terminal management server 43, contains the addresses of the servers 4, 6, 10, 20, and 30 that the client terminal management server will access. In this embodiment, two sets of address lists are stored, a primary address list used for the usual operation and a secondary address list used for backup purposes. For example, the client terminal management server 43, to which the server list shown in FIG. 3 is assigned, usually accesses the "MS1" management server 10, "NOC1" network monitoring server 30, "DC1" information providing server 20, "DNS3" DNS server 4, and "NTS1" NTS server 6. In FIG. 3, the server names such as "MS1" are used for convenience. In the actual list, the addresses of the servers 4, 6, 10, 20, and 30 are stored.

First, the management server 10 references the information management database 12, as well as the server lists stored in the server list holder 18, to obtain the load status of the servers operating in the load distributed system. That is, the servers in operation may be identified by the server manager 14, and the load on each server may be obtained by the load status collected by the server manager 14 and the total of the servers specified in the server list stored in the server list holder 18.

For example, consider the network monitoring server 30. The management server 10 calculates the load on the servers, NOC1, NOC2, NOC3, and so on, to select one of them as the network monitoring server 30 to be accessed by the client terminal management server 43. Based on the load on each server calculated as described above and on the system power and the available amount of resources, the management server 10 selects the network monitoring server 30 to be allocated to the client terminal management server 43. In the example shown in FIG. 3, the best network monitoring server 30, "NOC1", for the client terminal management server 43, is selected as the server to be included in the primary list, and the next best, "NOC3", as the server to be included in the secondary list. The management server 10 calculates the load on the servers as described above and selects on server as each of servers 4, 6, 10, 20, and 30 to be accessed by the client terminal management server 43 to generate the address list of the selected servers. For use in an actual operation, two sets of lists, primary and secondary, would be enough. More sets of lists may be prepared if necessary.

Figure 4:
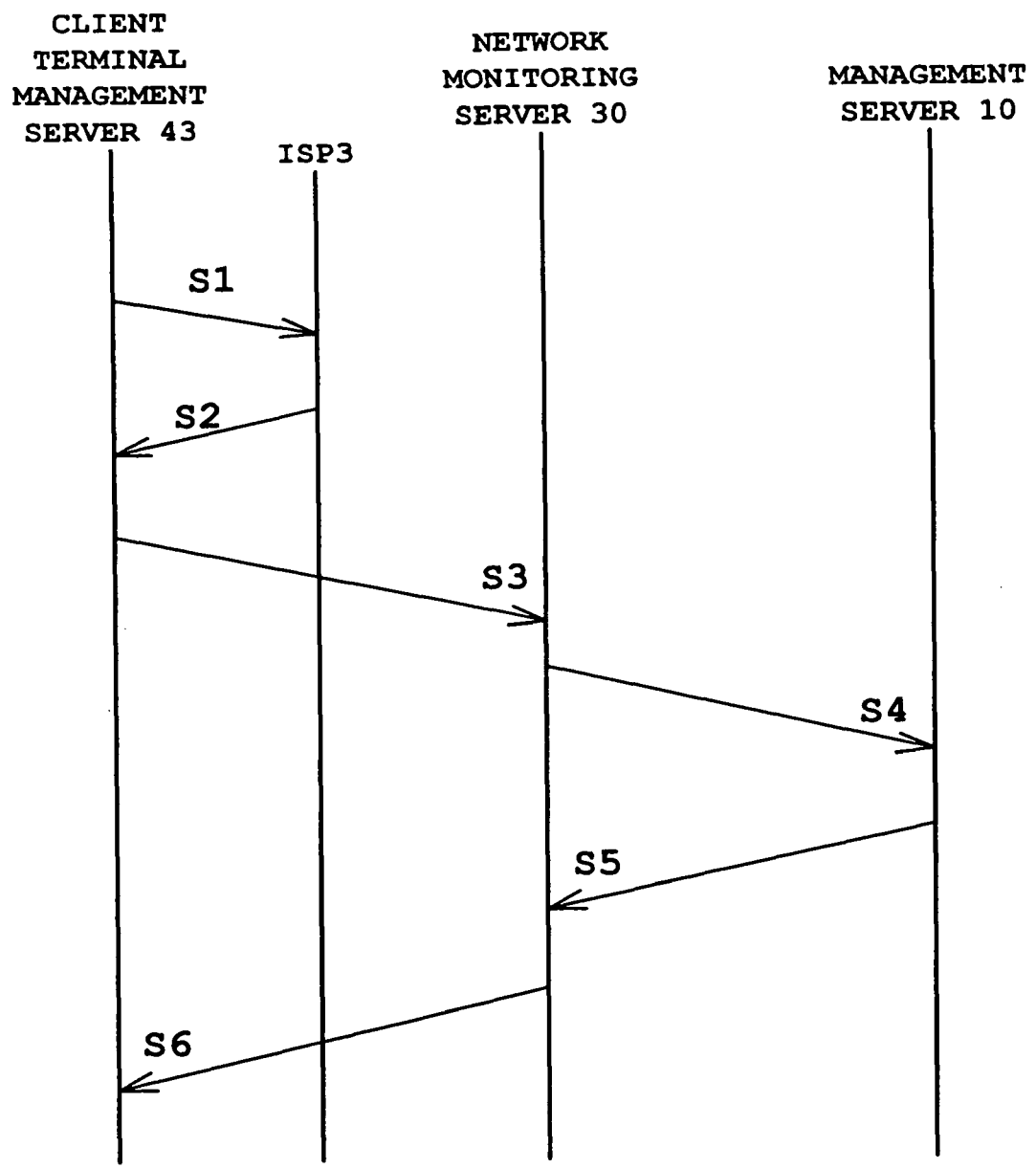
FIG. 4 is a flowchart showing processing executed when a client terminal management server 43 is initially installed.

The server list generated as described above is delivered to the client terminal management server 43. Now, referring to FIG. 4, processing executed when the client terminal management server 43 is initially installed will be described.

The IP address or DNS name of one of the network monitoring servers 30 is set in advance in a new client terminal management server 43 to be installed in the client system 40. Immediately after startup, the client terminal management server 43 receives authentication information of ADSL, CATV or the like from the client terminal 42 and connects to an ISP 3 (S1). After connecting to the ISP, the client terminal management server 43 obtains the authentication information from the ISP 3 (S2), extracts user identification information from the authentication information, and sends the extracted authentication information to the network monitoring server 30 (S3). The network monitoring server 30 transfers the received user identification information to the management server 10 (S4), and the management server 10 checks the user identification information to identify the client terminal management server 43 corresponding to the user. The management server 10 sends the server list of the client terminal management server 43 and information on the client terminal management server 43, which was unknown at the time of installation, to the network monitoring server 30 (S5). The network monitoring server 30 transfers the received information to the client terminal management server 43 (S6).

The client terminal management server 43 obtains the server list as described above and, based on the received information, initializes the server. As will become apparent in the description below, the server list manager 16 does not execute processing while the client terminal management server 43 is collecting information; instead, the server list manager 16 simply stores information as to which client terminal management server 43 uses which serve list. After generating the server list, the management server 10 notifies the servers 4, 6, 20, and 30 which client terminal management server 43 will access each server. Alternatively, the generated server list may be transferred directly to the servers 4, 6, 20, and 30.

Next, the operation executed when information is updated will be described.

In this embodiment, upon receiving the service pack release information (knowledge) on a management object OS1 V1.0, for example, "OS V1.0 service pack 1 has been released and is stored in A", the management server 10 interprets the contents of the received information (knowledge) and obtains the contents information (content) on the service pack from the specified storage location A. The management server 10 stores the contents information in the information management database 12 and sends the information to the information providing server 20. After confirming that the contents information has been sent, the management server 10 sends the update information (management information on the contents information) to the network monitoring server 30. The contents information is stored in the module database 22, while the update information is stored in the management information database 33.

Figure 5:
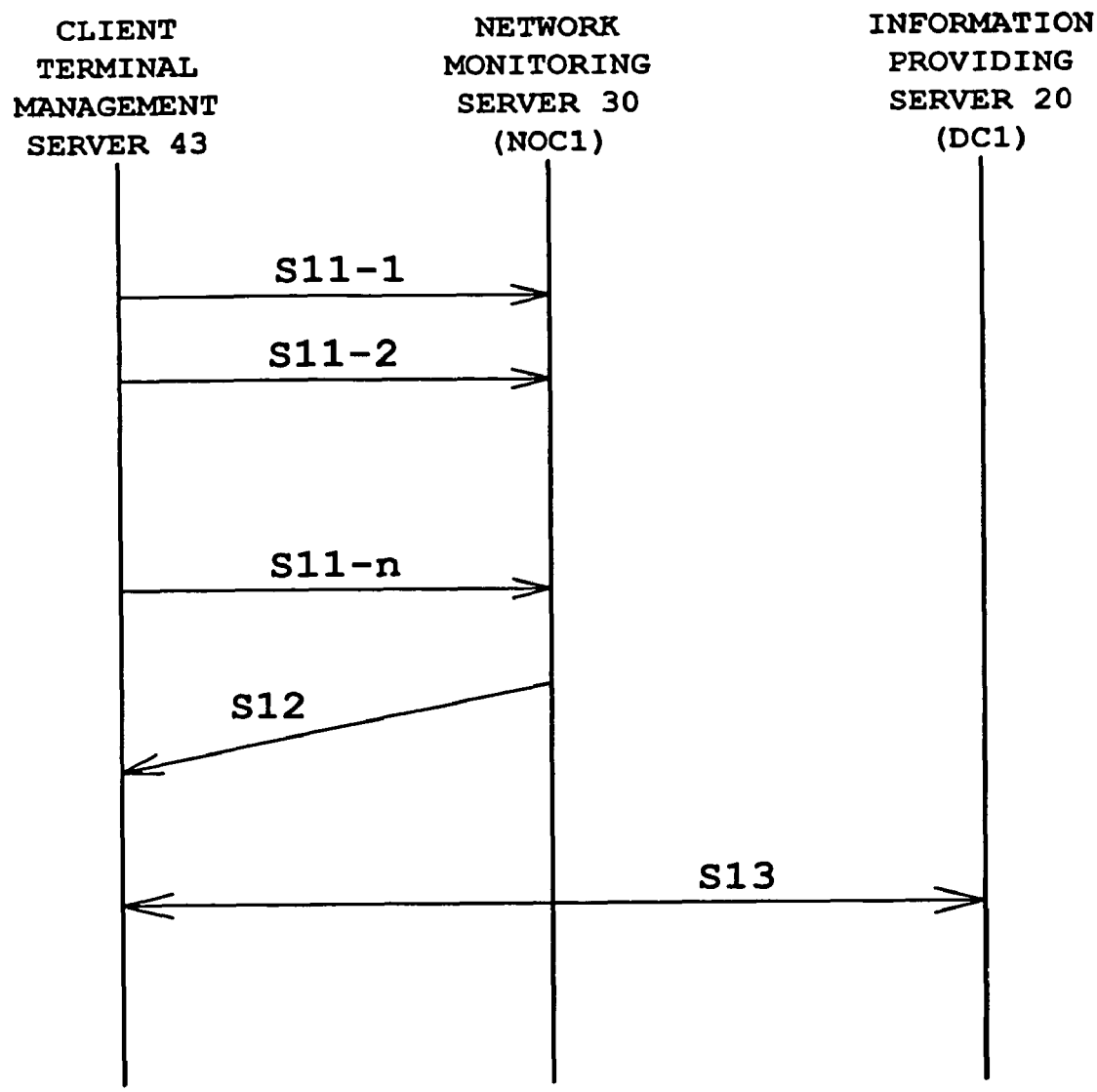
FIG. 5 is a flowchart showing system operation when information is updated.

Now, with reference to FIG. 5, how the client terminal management server 43 collects information will be described. The ISP 3 is omitted from FIG. 5. First, the inquiry unit 47 of the client terminal management server 43 checks the contents of the server list 45 to identify the network monitoring server 30 to be accessed. The inquiry unit 47 sends an inquiry to the identified network monitoring server 30 regularly, for example, at an interval of one minute, to check if the information has been updated (S11-1 to S11-n). The inquiry also allows the network monitoring server 30 to monitor the operating status of the client terminal management server 43 (confirms that the client terminal management server remains connected); similarly, the response to the inquiry allows the client to check if the network monitoring server 30 is in operation (alive). In the example shown in FIG. 3, the network monitoring server 30 to which an inquiry is sent is "NOC1". The contents of an inquiry (type of inquiry information) are stored in the client terminal management server 43 in advance. The information manager 32 of the network monitoring server 30 references the management information database 33 to check if the information specified by the inquiry has been updated. In the example described above, the inquiry sent from the client terminal management server 43 is the inquiry regarding OS1.

If the information specified by the inquiry has been updated, the information manager 46 of the client terminal management server 43 receives the corresponding management information from the network monitoring server 30 (S12). The information sent from the network monitoring server 30 is encapsulated information. The capsule contains information indicating that a new module has been generated, information as to which information providing server 20 contains the generated module in its module database 22, and an instruction to download the module. Thus, the information collection unit 48 obtains the corresponding information, that is, the new module (contents information) in this example, from the information providing server 20 specified in the capsule (S13). Actually, the information collection unit 48 accesses the information providing server 20, "DC1", specified in the server list 45. The obtained information is sent to the client terminal 42 when requested by the connected client terminal 42, or is used internally when needed by the client terminal management server 43.

The basic flow of information and processing in the load distributed system is as described above. In this embodiment, the client terminal management server 43 does not access the management server 10 when collecting information. As a result, the load of the management server 10 may be reduced. In particular, in this embodiment, an increase in the number of the client terminal management servers 43 simply results in an increase in the number of records in the server list holder 18. That is, even if the number of client terminal management servers 43, or the number of client terminals 42, increases infinitely, the load on the management server 10 never increases. In addition, the amount of data added to the server list holder 18 when the client terminal management server 43 is added to the system is only the amount required to store addresses of several servers. This amount of data is so small that it does not affect the load of the management server 10. In this manner, when collecting information in this embodiment, the client terminal management server 43 actively collects information directly from the servers 4, 6, 20, and 30 with no instruction from the management server 10, thus adding no load to the management server 10. Furthermore, because the client terminal management server 43 does not access the management server 10 when collecting information, the management server 10 may be replaced without stopping the whole load distributed system. Other servers 4, 6, 20, and 30, if multiplexed, may also be replaced during operation.

In addition to achieving the purpose of distributing the load, one management server 10 receives, generates, or obtains information concerning the client systems, contents information for obtaining or updating management object, and management information on contents information, necessary information may be collected and managed efficiently. In a system where emphasis is placed only on efficient information management and not on load distribution, the management server 10 need only monitor the operation status of the client terminal management servers 43 and need not distribute the processing of the management server 10 among the network monitoring server 30 and the information providing server 20.

The load status of the information providing server 20 and the network monitoring server 30 is judged by the information on the transfer speed (throughput) at which the client terminal management server 43 obtains information from the servers 20 and 30. When the load of the servers 20 and 30 is heavy, the response from those servers is thought to be slow; in this case, the inquiry frequency should be changed or, when the ping protocol is used to regularly check the operation (check if the server is alive), for example, the operation checking interval should be changed, based on the transfer speed information. For example, when the throughput indicated by the transfer speed information is low, the load of the server is thought to be heavy and, in this case, the frequency of an inquiry to be sent to the server should be reduced from once in one minute to once in two minutes.

The following describes processing that is executed when one of the servers fails. As described above, the client terminal management server 43 regularly sends inquiries to the network monitoring server 30. In this embodiment, this inquiry is used to monitor the client terminal management server 43. The network monitoring server 30 knows in advance which client terminal management server 43 will access the network monitoring server 30 and, as described above, the client terminal management server 43 sends inquiries to the network monitoring server 30 at a regular interval during normal operation. Therefore, when the client terminal management server 43 fails to send an inquiry for a predetermined time, that client terminal management server 43 is thought to have failed. The network monitoring server 30 notifies the management server 10 that the client terminal management server 43 has failed.

In this embodiment, the operation status of the client terminal management server 43 may be checked as described above. Even in this case, the management server 10 does not participate in the checking. That is, the ability to check the operation status of the client terminal management server 43 without using the management server 10 reduces the load on the management server 10. Another advantage is that, when the client terminal management server 43 has lost the server list 45 due to a failure and attempts to obtain the server list again, the client terminal management server 43 obtains the list not from the management server 10 but from the network monitoring server 30. Even in this case, the client terminal management server 43 does not add any load to the management server 10.

When the network monitoring server 30 fails while the client terminal management server 43 is making an inquiry at the network monitoring server 30, the client terminal management server 43 judges that the network monitoring server 30 has failed because no response is received for the period of time prescribed for checking the load status. Upon detecting this condition, the client terminal management server 43 switches the active set of servers from the primary set of the server list 45 to the secondary set and again queries the network monitoring server 30 that is in operation. Information collection is continued in this manner. In the example shown in FIG. 3, the network monitoring server 30 to be accessed is changed from "NOC1" to "NOC3".

In this case, the client terminal management server 43 notifies "NOC3" of the failure information indicating that "NOC1" does not respond. Then, NOC3 sends the failure information to the management server 10 to notify it of the failure.

Alternatively, the network monitoring server 30 may be multiplexed to allow the multiplexed members to continuously monitor each other. In this configuration, when the network monitoring server "NOC1" 30 fails, another multiplexed network monitoring server 30 immediately detects the failure and notifies the management server 10 that the network monitoring server "NOC1" 30 has failed.

Upon receiving the failure information, the management server 10 regenerates a server list for the client terminal management server 43 that has been accessing the failed network monitoring server 30 and sends the regenerated server list to the client terminal management server 43 via the network monitoring server 30 specified in the new primary list. The description of regeneration processing is omitted here because the processing here is the same as that of the generation processing described above. In this way, the client terminal management server 43 that has been accessing the servers using the secondary list now uses the primary list to access the servers.

The number of active servers 4, 6, 20, and 30 is reduced when any of them fail. On the other hand, as the load on the servers 4, 6, 20, and 30 increases, there is a possibility that mirror servers will be added. However, because the added servers will never be accessed unless the server list is updated. To solve this problem, the management server 10 is given the function of automatically regenerating the server list as the number of active servers changes. This function distributes the load evenly among the servers 4, 6, 20, and 30.

The procedure for building a mirror server will be described below with the network monitoring server 30 as an example. First, in a computer that will act as a copy of the network monitoring server 30, the service module that initializes the service-providing system and self-management system is started as an HTTPS (Hypertext Transfer Protocol Security)-based service sublet. The computer notifies the management server 10 that the initialization service has been started. The management server 10 checks the notifying computer if it will be able to act as a duplicate server and, if so, permits it to act as a mirror server. In response to this permission (trigger), the computer queries the management server 10 regarding information necessary for the network monitoring server. After receiving an answer from the management server 10, the computer reflects the received answer in the database, starts the service of the network monitoring server and, at the same time, notifies the management server 10 that service has been started.

The mirror servers of the servers 4, 6, 20, and 30 may be built in this manner. In response to the notifications from an added server, the management server 10 automatically regenerates a server list as described above.

An application is executed in the management server 10 to generate and transmit a server list, and another application is executed in the client terminal management server 43 to access the network monitoring server 30 or other servers based on the server list 45. These applications may also be stored on a computer-readable electromagnetic or optical recording medium such as a CD-ROM or DVD-ROM. That is, the servers 4, 6, 10, 20, 30, and 43 can install the application from the recording medium to execute the functions. The applications obtained via the network may also be installed in the servers to implement the function in the same manner.

In this embodiment, the client terminal management server 43 is provided to manage the client terminals 42 and the server list 45 is stored in that server. It is also possible that the management server 10 generates the server list and delivers it to the client terminals 42 directly or via the network monitoring server 30. Such a configuration eliminates the client terminal management server 43 from the client system 40.

In the above description, a server failure is given as an example of failure. However, if the information providing server 20 cannot collect information for some other reason, for example, because the load is heavy at that moment, the information providing server 20 suspends collection under certain conditions as described above (for example, information cannot be collected within a predetermined time). Therefore, it is possible under certain conditions that the version of the service pack (an example of updater) collected by DC1 is "1" but that the version of the service pack collected by DC3 is "2".

When, in such a case, the client terminal management server 43 acting as a client receives information from the network monitoring server 30 indicating that version "2" of the service pack has been released, the client terminal management server 43, which knows that the version of the service pack installed in the client terminal 42 is "1", accesses DC1 to obtain version 2 of the service pack. At this time, if the version of the service pack stored in DC1 is "1", the client terminal management server 43 finds that DC1 has not yet updated the service pack correctly. Then, client terminal management server 43 sends failure information 30 indicating that DC1 has not yet updated the service pack correctly to the network monitoring server, and the network monitoring server 30 sends this failure information to the management server 10. In response to this information, the management server 10 may take one of two actions. In the first action, the management server 10 instructs DC1 to collect the version 2 of the service pack again. In the second action, the management server 10 checks the server list used by the clients, deletes DC1 from the server list if it is included, generates a new server list, and then delivers the generated new server list to the clients corresponding to the serve list.

In the above example, a failure is recognized when the version of the service pack stored in the client is the same version of the service pack stored in the information providing server. A failure may also be recognized when the version of the service pack stored in the information providing server 20 is earlier than that of the service pack stored in the client or when the difference between the version of the service pack reported by the network monitoring server 30 and that of the service pack stored in the information providing server 20 is equal to or larger than a predetermined value.

This embodiment may also be applied to a large network in which a very large number of clients and servers are included. In such a large network, it is probable that the versions of information stored in the servers differ as described above. In some cases, it is possible that the entity of the service pack with the latest version reported by the network monitoring server 30 is not stored in any of the information providing servers 20 included in the server list. In such a situation, if the client must report failure information to the management server 10 each time such a condition occurs or if the client must access the information providing server 20 many times, the load cannot be reduced.

To avoid this, the client terminal management server 43 may execute the following operation. That is, the client terminal management server 43 manages the version (current version) of the service pack installed in the client terminals 42 which are included in the same client system 40 and in which OS1 is installed. Upon receiving information from the network monitoring server 30 indicating that the latest service pack has been released, the client terminal management server 43 compares the service pack version (latest version) included in the information with the current version which it manages.

If the latest version is later than the currently employed version, the client terminal management server 43 references the server list and accesses one of the information providing servers 20 (DC1 in the example in FIG. 3) included in the server list. The client terminal management server 43 checks if the version of the service pack stored in DC1 is the latest version. If the version is the latest version, the client terminal management server 43 obtains the latest version of the service pack and ends processing. If the version is not the latest version, the client terminal management server 43 compares the version of the service pack stored in DC1 with the current version and, if the version of the service pack is later than the current version, obtains the service pack and ends processing.

That is, in this embodiment, if the version of the service pack stored in the information providing server 20 is not the latest version but is later than the current version, the client terminal management server 43 performs adaptive processing; that is, the client terminal management server 43 obtains the updater and ends processing. Alternatively, if DC1 does not provide the latest version of the service pack, the client terminal management server 43 may also compare the versions of the service pack between the information providing servers 20 included in the server list (between DC1 and DC3 in the example in FIG. 3) to obtain the service pack whichever is later.

The system described above efficiently collects and manages information such as information regarding the client system, contents information used to obtain and update information on management objects, and information used to manage contents information.

In addition, a server list is generated to enable the client terminal management server, which collects information, to actively and directly access an information providing server based on the server list with no instructions from the management server, eliminating the need for accessing of the management server. This results in a reduction in the load on the management server. Another advantage is that, the management server, which is not accessed by the client terminal management servers, may be replaced without stopping the system.

Should the network monitoring server fail, the server list is re-generated. Therefore, the client terminal management server always has access to an active server list.

Because multiple sets of server lists are provided in this embodiment, even if one of the servers included in one server list fails, another server list may be used to continuously access the server in operation.

In addition, a regular inquiry regarding the presence of update information is sent from the client terminal management server to the network monitoring server, is used also as the alive information. From this alive information, the network monitoring server can understand that the client terminal management server is in operation.

While there have been described what are at present considered to be preferred embodiments of the invention, it will be understood that various modifications may be made thereto, and it is intended that the appended claims cover all such modifications as fall within the true spirit and scope of the invention.

What is claimed is:

1. A management server in a load distributed system that executes system management of a network system, said management server comprising:

an intra-system information management database in which information providing server management information is recorded, wherein said intra-system information management database is used for keeping track of information distributed among a plurality of information providing servers; and a server list management device for selecting servers to be accessed by each of one or more client systems to generate a server list of said selected servers based on said intra-system information management database and on a load status of every server included in said network system, wherein the server list includes a primary address list used for usual operation and a secondary address list used for backup purposes, when collecting information, each of said client systems references said primary address list of said server list in said usual operation in order to directly access said servers, and, if failure of a first server is detected by attempting to access said first server using an address included in said primary address list, each of said client systems accesses a second server corresponding to an address included in said secondary address list, and notifies said second server that said first server has failed, and said second server sends system failure information which indicates that said first server has failed to said management server in response to said notification, if said system failure information which indicates that said first server has failed is sent from said second server, said server list management device re-generates the server list and sends the re-generated server list to at least one or more client systems that access said first server, and the network system is formed of, at least, the one or more client systems, the plurality of information providing servers storing information to be referenced by said client systems, and a network monitoring server with a network monitoring function.

2. An information management method for use in a load distributed system including a management server that executes system management of a network system, comprising the steps of:

selecting, via one or more processors, servers to be accessed by each of one or more client systems based on an intra-system information management database in which information providing server management information for monitoring information distributed among a plurality of information providing servers is stored and on a load status of every server included in the network system; and generating, via the one or more processors, a server list of said selected servers, wherein the server list includes a primary address list used for usual operation and a secondary address list used for backup purposes, when collecting information, each of said client systems references said primary address list of said server list in said usual operation in order to directly access said servers, and, if failure of a first server is detected by attempting to access said first server using an address included in said primary address list, each of said client systems accesses a second server corresponding to an address included in said secondary address list, and notifies said second server that said first server has failed, and said second server sends system failure information which indicates that said first server has failed to said management server in response to said notification, if said system failure information which indicates that said first server has failed is sent from said second server, the server list is re-generated and the re-generated server list is sent to at least one or more client systems that access said first server, and the network system formed of, at least, the one or more client systems, the plurality of information providing servers each storing information to be referenced by the client systems, and a network monitoring server with a network monitoring function.

3. A non-transitory computer readable medium that stores a program for use in a load distributed system and for execution on a management server that executes system management of a network system, the program causing the management server to:

select servers to be accessed by each of one or more client systems based on information providing server management information that keeps track of information distributed among a plurality of information providing servers and on a load status of every server included in the network system; and generate a server list of said selected servers, wherein the server list includes a primary address list used for usual operation and a secondary address list used for backup purposes, when collecting information, each of said client systems references said primary address list of said server list in said usual operation in order to directly access said servers, and, if failure of a first server is detected by attempting to access said first server using an address included in said primary address list, each of said client systems accesses a second server corresponding to an address included in said secondary address list, and notifies said second server that said first server has failed, and said second server sends system failure information which indicates that said first server has failed to said management server in response to said notification, if said system failure information which indicates that said first server has failed is sent from said second server, the server list is re-generated and the re-generated server list is sent to at least one or more client systems that access said first server, and the network system formed of, at least, the one or more client systems, the plurality of information providing servers each storing information to be referenced by the client systems, and a network monitoring server with a network monitoring function.

* * * * *